United States Patent
Zimmer et al.

(10) Patent No.: US 7,136,994 B2
(45) Date of Patent: Nov. 14, 2006

(54) RECOVERY IMAGES IN AN OPERATIONAL FIRMWARE ENVIRONMENT

(75) Inventors: Vincent J. Zimmer, Federal Way, WA (US); Michael A. Rothman, Gig Harbor, WA (US)

(73) Assignee: Intel Corporation, Santa Clara, CA (US)

( * ) Notice: Subject to any disclaimer, the term of this patent is extended or adjusted under 35 U.S.C. 154(b) by 438 days.

(21) Appl. No.: 10/438,368

(22) Filed: May 13, 2003

(65) Prior Publication Data

US 2004/0230788 A1    Nov. 18, 2004

(51) Int. Cl.
 *G06F 9/455*    (2006.01)
(52) U.S. Cl. ............... 713/2; 713/1; 713/100
(58) Field of Classification Search ............ 713/2, 713/1, 100
 See application file for complete search history.

(56) References Cited

U.S. PATENT DOCUMENTS

| | | | |
|---|---|---|---|
| 5,230,052 A | 7/1993 | Dayan et al. | |
| 6,173,417 B1 * | 1/2001 | Merrill | 714/15 |
| 6,629,259 B1 * | 9/2003 | Lee | 714/2 |
| 6,636,963 B1 * | 10/2003 | Stein et al. | 713/1 |
| 6,745,324 B1 * | 6/2004 | Skazinski et al. | 713/2 |
| 6,934,875 B1 * | 8/2005 | Kashyap | 714/4 |
| 6,934,879 B1 * | 8/2005 | Misra et al. | 714/6 |
| 6,944,758 B1 * | 9/2005 | Lin | 713/2 |
| 2002/0078338 A1 * | 6/2002 | Lay et al. | 713/2 |
| 2003/0188220 A1 * | 10/2003 | Misra et al. | 714/6 |
| 2004/0025002 A1 * | 2/2004 | Cepulis et al. | 713/2 |
| 2004/0088367 A1 * | 5/2004 | Reinke | 709/215 |

* cited by examiner

*Primary Examiner*—Thomas C. Lee
*Assistant Examiner*—Vincent Tran
(74) *Attorney, Agent, or Firm*—Blakely, Sokoloff, Taylor & Zafman LLP

(57) ABSTRACT

A method and system to create a recovery image of firmware stored in a firmware storage device of a computer system. A recovery image of firmware is created and stored at a target location, wherein the target location includes a magnetic disk. The firmware storage device to store Basic Input/Output System (BIOS) firmware and/or Non-Volatile Random Access Memory (NVRAM) Data of an Extensible Firmware Interface (EFI) compliant computer system. In one embodiment, the firmware of the computer system is recovered from the recovery image.

29 Claims, 4 Drawing Sheets

RECOVERY IMAGES IN AN OPERATIONAL FIRMWARE ENVIRONMENT

FIELD OF THE INVENTION

The field of invention relates generally to computer systems and, more specifically but not exclusively, relates to creating a recovery firmware image of the operation configuration of a computer system.

BACKGROUND INFORMATION

During a computer system start-up, the computer system is self-tested and initialized through loading and execution of system firmware. Under personal computer (PC) architectures, this firmware is commonly referred to as the system's Basic Input/Output System (BIOS). In a typical PC architecture, the BIOS is generally defined as the firmware that runs between the processor reset and the first instruction of the Operating System (OS) loader. This is commonly referred to as the pre-boot phase and precedes the OS boot phase. At the start of a boot, very little of the system beyond the processor and firmware is actually initialized. It is up to the code in the firmware to initialize the system to the point that an operating system loaded off of media, such as a hard disk, can take over.

In today's computer systems, the BIOS is stored in a non-volatile memory device, such as a flash memory device. If the non-volatile memory device should fail or the firmware stored thereon become corrupted, then the computer system may become unusable. While operating systems offer the ability to create a "rescue disk" to load minimal files necessary for running an operating system in a safe mode, the firmware of a computer system offers no corresponding ability to create such a "rescue disk" for the pre-boot phase of a computer system.

Manufactures of computer systems and peripherals may enclose an original firmware image, for example stored on a CD-ROM, with the purchase of a product having firmware. If the firmware should become corrupted, the user can recover the firmware by re-loading (e.g., re-flashing) the firmware from the original firmware image. However, when the original firmware image is re-loaded, configuration settings and firmware updates subsequent to the purchase of the platform will be lost. In the case of updating the BIOS of a computer system, when the user recovers the firmware, the platform may not function properly because the boot block of the original firmware image no longer matches the configuration of the platform. Additionally, with the proliferation of many computer system configurations and customizations within a single product line, the ability to disseminate and manage firmware code for each particular platform has become untenable.

BRIEF DESCRIPTION OF THE DRAWINGS

The present invention is illustrated by way of example and not limitation in the accompanying figures.

DETAILED DESCRIPTION

Embodiments of a method for creating and storing a firmware recovery image and computer apparatus for implementing the method are described herein. In the following description, numerous specific details are set forth, such as embodiments pertaining to the Extensible Firmware Interface (EFI) framework standard, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
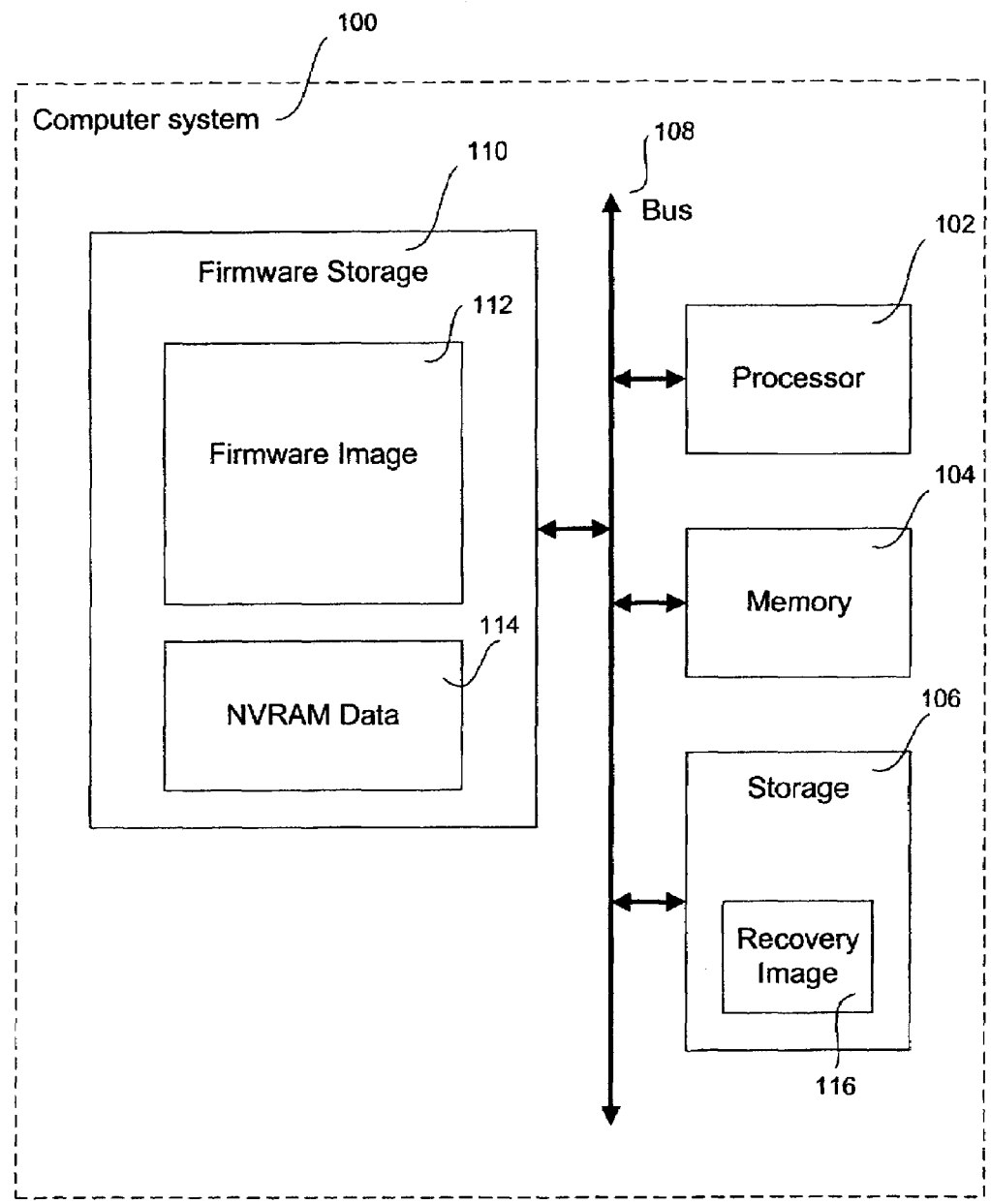
FIG. 1 is a schematic diagram illustrating one embodiment of a computer system in accordance with the teachings of the present invention.

With reference to FIG. 1, a computer system 100 to create and to store a recovery image of firmware of the computer system 100 in accordance with one embodiment of the invention is shown. The computer system 100 includes a processor 102, a memory 104, and a firmware storage 110 coupled to a bus 108. Generally, computer system 100 may include, but is not limited to, a personal computer, a network workstation, a portable computer, a handheld or palmtop computer, a personal digital assistant (PDA), a wireless phone, a digital camera, or the like. In one embodiment, computer system 100 is configured in a similar manner to an exemplary computer system discussed below in conjunction with FIG. 5.

The firmware storage 110 is a non-volatile storage device including, but not limited to, a flash memory device, an Erasable Programmable Read Only Memory (EPROM), an Electronically Erasable Programmable Read Only Memory (EEPROM), or the like. In FIG. 1, firmware storage 110 stores firmware image 112. Firmware image 112 includes instructions and/or data executable by computer system 100. In one embodiment, firmware image 112 includes BIOS firmware for a personal computer. In another embodiment, firmware image 112 includes firmware stored in a firmware storage device of an expansion board installed on a personal computer. In another embodiment, firmware image 112 is firmware stored in a firmware storage device of a wireless phone, PDA, digital camera, or the like.

In an EFI compliant system, firmware storage 110 also includes Non-Volatile Random Access Memory (NVRAM) Data 114. NVRAM Data 114 is firmware used by computer system 100 to operate in accordance with the EFI framework standard. Generally, the instructions and/or data of firmware image 112 and the NVRAM Data 114 are not co-mingled if stored in the same firmware storage device. In one embodiment, NVRAM Data 114 is stored in a different firmware storage device (not shown in FIG. 1) than the firmware image 112. NVRAM Data will be discussed further in conjunction with FIG. 2.

In one embodiment of the present invention, firmware storage 110 includes instructions and data in accordance with an EFI framework standard (specifications and examples of which may be found at http://developer.intel.com/technology/efi). Today's firmware architectures include provisions for extending BIOS functionality beyond that provided by the BIOS code stored in a platform's BIOS device (e.g., flash memory). More particularly, the Extensible Firmware Interface enables firmware, in the form of firmware modules and drivers, to be loaded from a variety of different resources, including primary and secondary flash devices, option ROMs, various persistent storage devices (e.g., hard disks, CD ROMs, etc.), and even over computer networks. Under one scheme in accordance with the EFI framework, the initialization process includes various execution phases of firmware stored on a computer system. These execution phases include a Pre-EFI Initialization (PEI) phase, a Driver execution Environment (DXE) phase, and an EFI 1.0 execution phase. These phases enable initialization and set-up of various platform devices and services, and enable an operating system to be booted in accordance with an OS launch phase that follows the EFI 1.0 execution phase.

In one embodiment, the firmware storage 110 is a flash memory device. Those skilled in the art will understand that the invention may be implemented with other types of persistent storage devices for maintaining firmware code and/or data, and the embodiments of the invention using flash devices discussed herein are merely exemplary schemes for practicing the invention.

Flash memory is a non-volatile memory technology that allows manufactures and (with the appropriate hardware/software) end users to electrically erase and (re)program information. Flash Memory is typically erased in units of memory called blocks instead of being erased at the bit level, wherein all bits in a given block are switched to a predetermined polarity (i.e., logic level) when the block is erased. In one embodiment, the block size is 64 k. In another embodiment, the block size is 32 k. In one common type of flash memory, such as flash memory devices manufactured by the Intel Corporation, blocks of memory are erased electronically by setting all bits in a block to 1's. Data can then be written to the block by flipping individual bits to 0's to form appropriate bit patterns corresponding to the data. In other types of flash devices, the erased logic state is all 0's, and writing data to these devices comprising changing individual bits to 1's. It is noted that in conventional flash devices, individual bits cannot be flipped from a changed (i.e., set) logic level back to the erased logic level; in order to update data in a block, all of the bits have to be erased first, and then rewritten.

Also in FIG. 1, a recovery image 116 is stored in a storage 106 coupled to bus 108, in accordance with one embodiment of the present invention. Such a storage device includes, but is not limited to, a magnetic drive, an optical drive, or the like. In an alternative embodiment, storage 106 is not part of computer system 100, but accessible by computer system 100. For example, in one embodiment, a system administrator could store a recovery image of the BIOS firmware of a client in a storage device of a server over a network. Such a network includes, but is not limited to, the Internet, a local area network (LAN), a wide area network (WAN), or the like. In another embodiment, computer system 100 is a wireless phone. A recovery image of firmware stored in the wireless phone could be stored in a storage device of a user's home computer over a wireless connection, a Universal Serial Bus (USB) connection, or the like.

With reference to the flowchart of FIG. 2, one embodiment of the present invention operates in the following manner to create and store a recovery image of firmware stored in a firmware storage device of a computer system. The process begins in a block 202, which corresponds to a system startup event, i.e., a cold boot or a system reset.

In response to the startup event, onboard initialization of the computer system will begin through loading and execution of system boot instructions stored in the computer system's BIOS firmware, as depicted by a block 204. In one embodiment, the computer system boot instructions will begin initializing the computer system by conducting a Power-On Self-Test (POST) routine, initializing system board functions, checking for any expansion boards that hold additional BIOS firmware, and loading such BIOS firmware if any is found.

In a decision block 206, the computer system determines if a request to create a recovery image has been made. If the answer is no, the logic proceeds to a block 214 to continue initialization of the computer system. If the answer is yes, then the logic proceeds to a decision block 208.

In decision block 208, a determination is made as to whether a request to store NVRAM Data has been made. NVRAM Data is information associated with an EFI compliant system and includes NVRAM variables and EFI load options. The NVRAM Data is stored in a firmware storage device of the computer system, but is separate from the BIOS firmware image.

In an EFI system, once the EFI firmware is initialized, it passes control to a boot manager. The boot manager is a component in the EFI firmware that determines which EFI drivers and EFI applications should be explicitly loaded and when. The boot manager will attempt to load EFI drivers and EFI applications (including EFI OS boot loaders) in an order defined by the NVRAM variables. The NVRAM Data can also contain load options that are passed directly to the EFI image.

The boot manager allows the loading of EFI applications (including OS $1^{st}$ stage loader) or EFI drivers from any file on an EFI defined file system or through the use of an EFI defined loading service. The NVRAM variables are used to point to the file to be loaded. These NVRAM variables also contain application specific data that are passed directly to the EFI application. Additionally, the NVRAM variables contain a human readable Unicode string that can be displayed to a user in a menu.

In decision block 208, if the answer is yes, then the logic proceeds to a block 210 to store the NVRAM Data to a target location. After storing the NVRAM Data the logic proceeds to a block 212 to store the contents of the firmware image in a recovery image at a target location. If the answer to decision block 208 is no, then the logic proceeds directly to block 212 to store the contents of the firmware image in a recovery image at a target location. As will be appreciated, blocks 208 and 210 relate to one embodiment implemented with an EFI compliant computer system. In an embodiment implemented in a non-EFI compliant system, the logic of blocks 208 and 210 are not employed. In a non-EFI framework standard, if the answer to decision block 206 is yes, the logic proceeds to block 212.

In block 212, the computer system creates and stores a recovery image of the firmware image of the computer system. The recovery image is a copy of at least a portion of the firmware of the computer system. In one embodiment, the recovery image is a copy of the entire BIOS firmware image. Such a recovery image includes a complete 1:1 mapping of the BIOS firmware image. In another embodiment, the recovery image is a copy of the NVRAM Data. In another embodiment, a single recovery image includes both a copy of the firmware image and the NVRAM Data of an EFI compliant system. Such a recovery image could have a logical separation of code and data within the recovery image that is opaque to the user.

In another embodiment of the present invention, the recovery image is a copy of a portion of the BIOS firmware. Such a portion includes the firmware code necessary to successfully boot a computer system to a "BIOS safe mode." This is also referred to as "Crisis Recovery." Generally, a BIOS safe mode is a pre-boot phase of the computer system that is functionally restrictive and germinates enough state to allow a subsequent firmware update. For example, a typical BIOS firmware has a firmware boot block that contains BIOS code to enable the computer system to enter a pre-boot phase having essential functionality. Such a firmware boot block may contain enough code to allow the computer system to access a floppy disk drive. In this way, a user could utilize a floppy disk to update the BIOS firmware or to restore the old BIOS firmware. The BIOS safe mode offers the opportunity to operate the computer system in a simplified mode for troubleshooting the computer system without all the complexities of a normal pre-boot phase.

In block 212, the recovery image is stored at the designated target location. In one embodiment, in a request to create a recovery image in decision block 206, the computer system requests from a user a target location to store the recovery image. In another embodiment, the target location is pre-set to a default location. The target location is a storage device accessible by the computer system, such as storage 106 in FIG. 1.

In one embodiment, the NVRAM Data and the firmware image can be stored to the same recovery image. In another embodiment, the NVRAM Data and the firmware image are stored to two different recovery images. In this embodiment the two recovery images can be stored to the same location or to different locations.

After the recovery image is stored, the computer system continues the initialization process, as in a block 214. The initialization process completes the pre-boot phase and then proceeds to load an operating system.

The stored recovery image can be used to recover firmware to a firmware storage device. In one embodiment, the recovery image is loaded into the firmware storage device from the target location during the pre-boot phase. In another embodiment, recovering the firmware includes loading the recovery image, which includes BIOS firmware, from the target location to a memory device, such as system Random Access Memory (RAM), and executing instructions contained in the recovery image from the memory device. The recovery image is executed from the memory device in order to perform the pre-boot phase of the computer system. The pre-boot phase is followed by the OS boot as per a normal startup cycle. Once the computer system completes the OS boot and is in OS run-time, the user can take further action to diagnose problems with the computer system, the BIOS firmware, or the firmware storage device. During the OS run-time, the user could also load the recovery image into the firmware storage device.

It will be appreciated that instructions executed by a processor to create and to store the recovery image are maintained in a firmware storage device. As discussed above, in one embodiment, the recovery image is created during the pre-boot of a computer system. In an alternative embodiment, the recovery image is created during operating system run-time. In this embodiment, the OS makes a request to the firmware (e.g., a BIOS) to create and store a recovery image. The firmware proceeds to generate a recovery image as described herein in response to the OS request and notifies the OS when the recovery image processing is complete.

Figure 2:
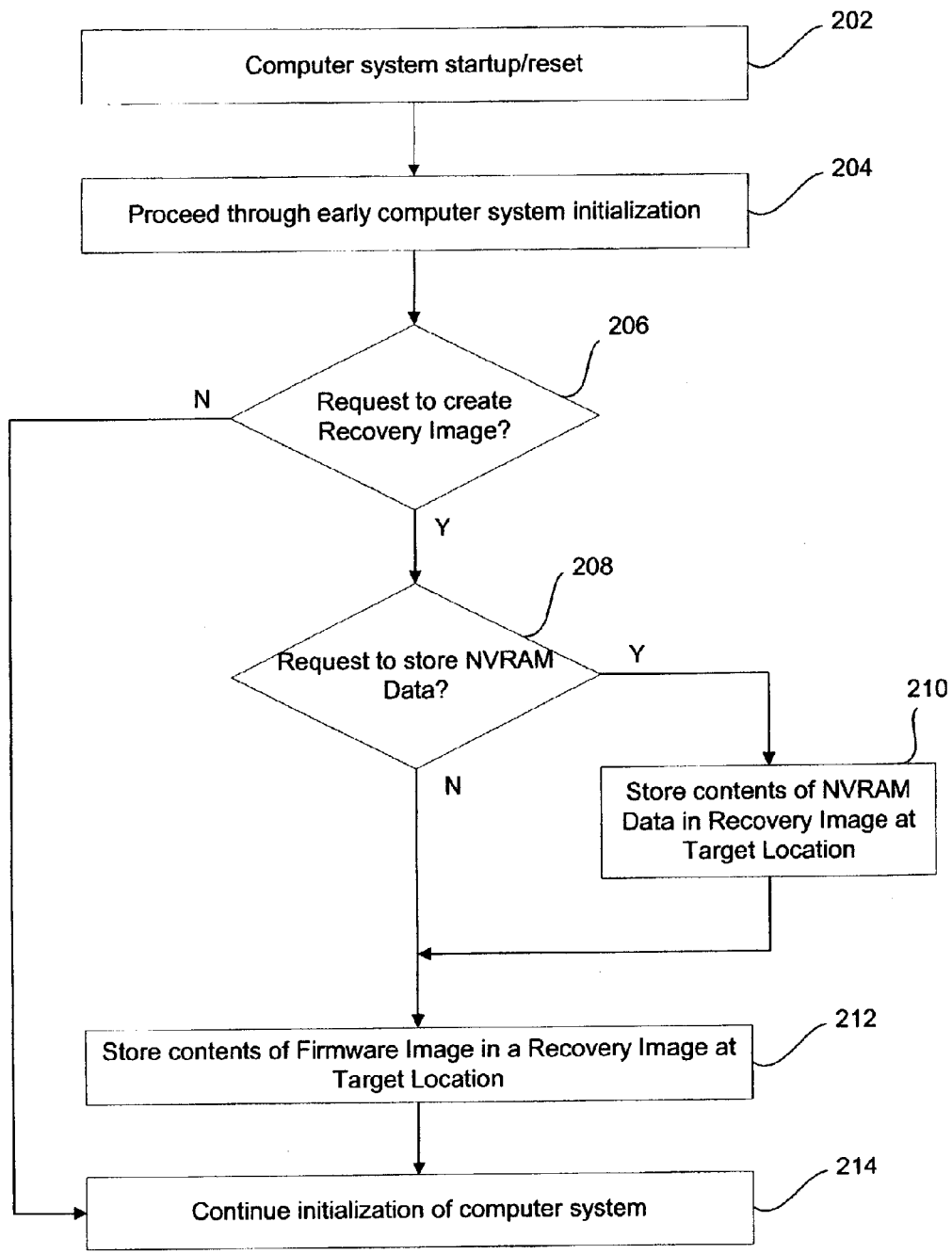
FIG. 2 is a flowchart illustrating the logic and operations performed by one embodiment of the invention to create and store a firmware recovery image.

The method of FIG. 2 offers numerous advantages. The ability to archive a recovery image of BIOS firmware ensures that the recovery image matches the associated platform hardware and firmware boot block. Also, manufactures no longer need to ship a CD-ROM or a floppy disk having stored the original firmware code with the sale of a product. This results in cost savings for the manufacturer and eliminates the need to manage an additional Stock-Keeping Unit (SKU). Additionally, any updates to the firmware during the life of the platform can be stored. Thus, restoring a corrupted firmware via a recovery image will restore the firmware to its last previous state and not the firmware state as shipped. Lastly, the ability to warehouse the state of platform firmware becomes more important as boot code and boot data migrate from on-disk structures, like the boot.ini file for the Windows operating system, to in-firmware structures, like the EFI boot options.

Figure 3:
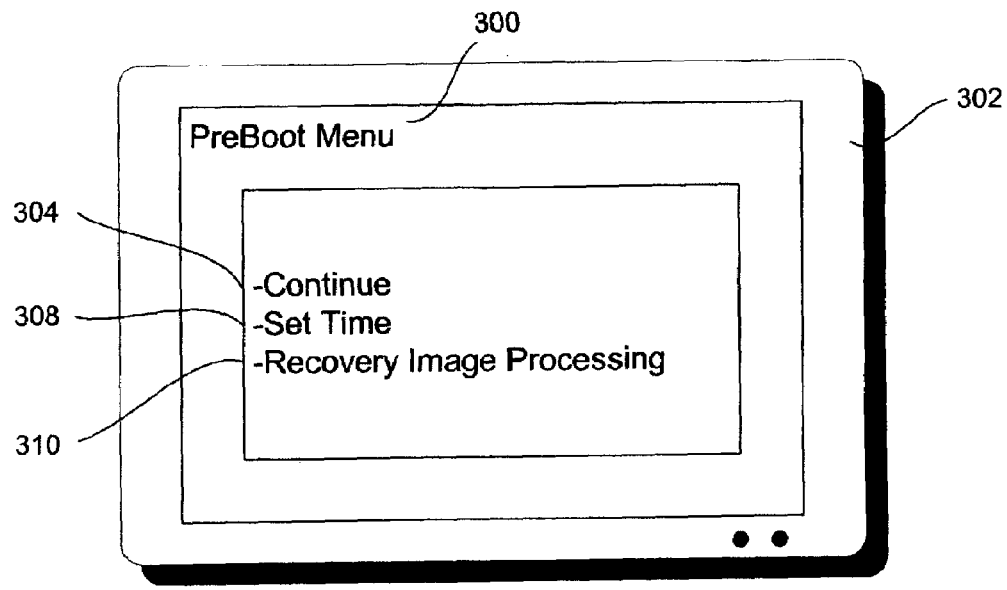
FIG. 3 is a schematic diagram of a user menu screen according to one embodiment of the present invention.

Referring to FIG. 3, a Pre-boot Menu 300 is depicted on a computer monitor 302 in accordance with one embodiment of the present invention. In one embodiment, the Pre-boot Menu 300 is generated during the initialization of a computer system in response to a user input. An example of such a user input includes a user pushing a function key such as "F10" on a keyboard coupled to a computer system during pre-boot phase of the computer system. Such pre-boot utilities and corresponding menus (e.g., a setup menu) are well known in the art.

Continuing in FIG. 3, the Pre-boot Menu 300 includes several options. Selecting option 304 will continue the pre-boot initialization of the computer system. Option 308 can be selected to set the time of the computer system. A user selects option 310 to request recovery image processing. A user operates an input device coupled to the computer system, such as a mouse or a keyboard, to select one of the options available in the Pre-boot Menu 300.

Figure 4:
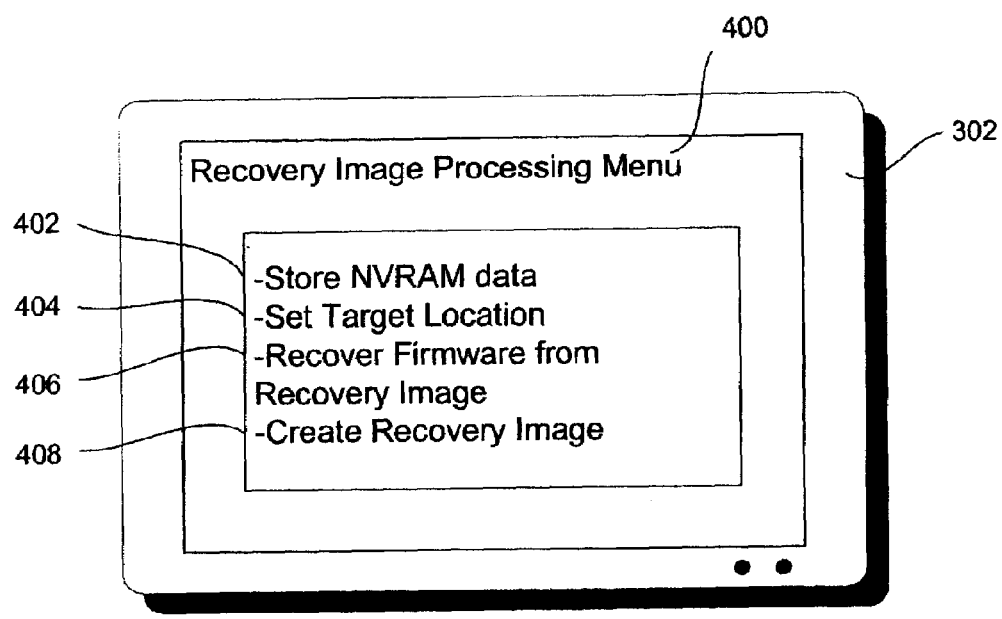
FIG. 4 is a schematic diagram of a user menu screen according to one embodiment of the present invention.

FIG. 4 shows a Recovery Image Processing Menu 400 on computer display 302. The Recovery Image Processing Menu 400 was generated in response to a user selection of option 310 in FIG. 3. The Recovery Image Processing Menu 400 includes the following options. Option 402 is used to store NVRAM Data of an EFI compliant system. An embodiment on a computer system not implementing the EFI framework would not necessarily display option 402. A user can select option 404 to set the target location of a recovery image. In one embodiment, the target location is preset to a default location by the original equipment manufacturer (OEM), but can be modified by a user. Option 406 can be selected to recover firmware from a recovery image. To create a recovery image, a user can select option 408. The recovery image is created and stored according to one or more embodiments described herein.

The Pre-boot Menu 300 and the Recovery Image Processing Menu 400 are not limited to the representations shown in FIGS. 3 and 4. These menus could also be implemented in a voice recognition system, on a wireless phone menu system, through a remote terminal connected to the computer system via a network connection, or any other means to enable a user to interact with a computer system.

Figure 5:
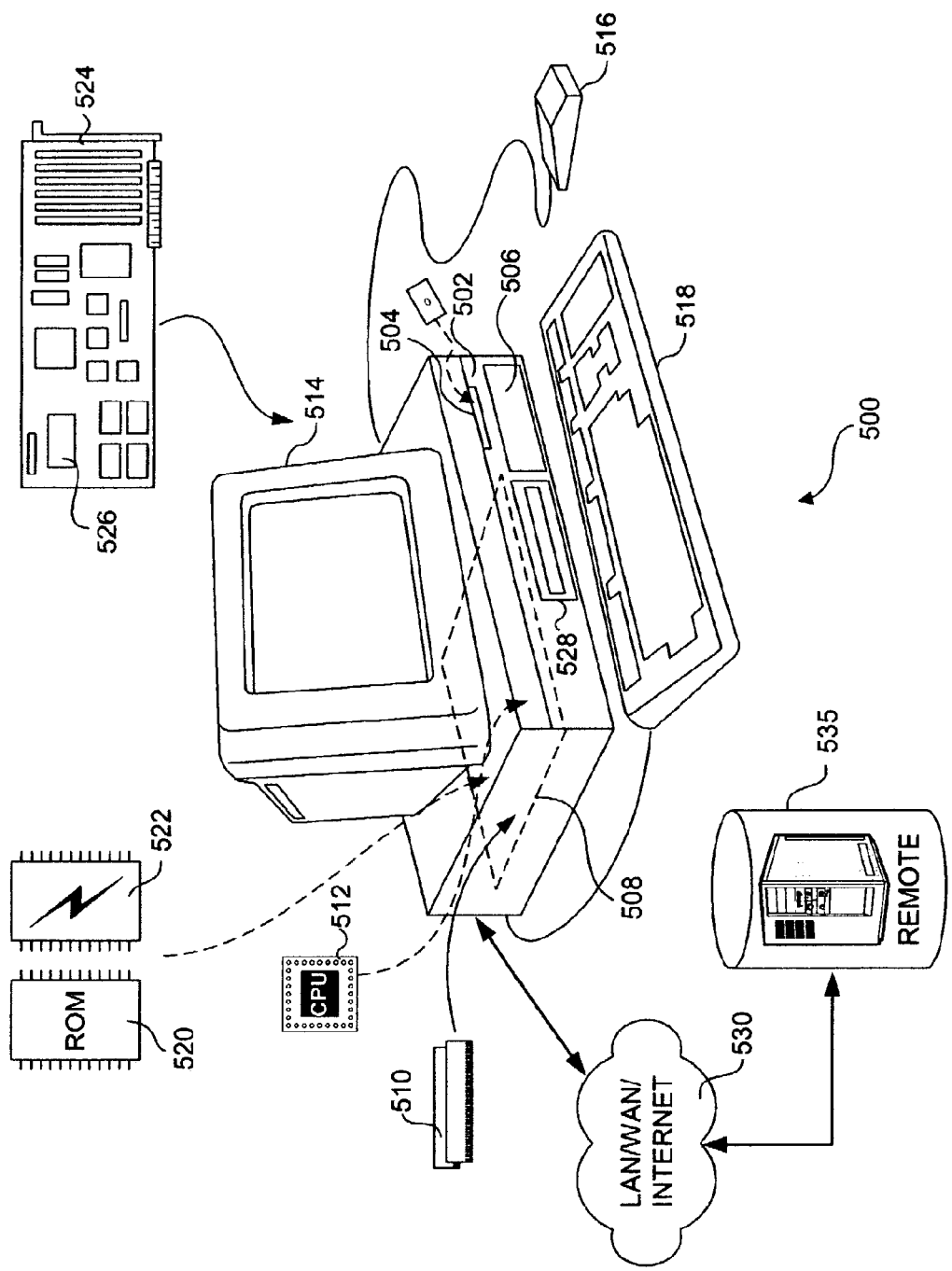
FIG. 5 is a diagram illustrating a computer system for implementing an embodiment of the present invention.

FIG. 5 illustrates an embodiment of an exemplary computer system 500 for practicing an embodiment of the invention described herein. Computer system 500 is generally illustrative of various types of computer devices, including personal computers, laptop computers, workstations, servers, etc; for simplicity, only the basic components of the computer system are discussed herein. Computer system 500 includes a processor chassis 502 in which various hardware components are housed, including a floppy disk drive 504, a hard disk 506, a power supply (not shown), and a motherboard 508 populated with appropriate integrated circuits including system memory 510 coupled to one or more processors 512. Memory 510 may include, but is not limited to, Dynamic Random Access Memory (DRAM), Static Random Access Memory (SRAM), Synchronized Dynamic Random Access Memory (SDRAM), Rambus Dynamic Random Access Memory (RDRAM), or the like. Processor 512 may be a conventional microprocessor including, but not limited to, an Intel Corporation x86, Pentium, XScale, or Itanium family microprocessor, a Motorola family microprocessor, or the like. Hard disk 506 may comprise a single unit, or multiple units, and may optionally reside outside of computer system 500. The system also includes a boot firmware device on which firmware is stored, which may typically comprise non-volatile memory such as a ROM device 520 or a flash device 522. The motherboard may include other firmware devices as well (not shown). In general, the system's processors will comprise 32- or 64-bit architectures, and the system memory will include physical addressing schemes appropriate to the processor(s), and may be accessed via corresponding address and data buses to which the processor(s) and the memory are connected.

A monitor 514 is included for displaying graphics and text generated by firmware, software programs and program modules that are run by computer system 500, such as system information presented during system boot. A mouse 516 (or other pointing device) may be connected to a serial port, USB port, or other like bus port communicatively coupled to CPU(s) 512. A keyboard 518 is communicatively coupled to motherboard 508 in a similar manner as mouse 516 for user entry of text and commands. In one embodiment, computer system 500 also includes a network interface card NIC or built-in NIC interface (not shown) for connecting computer system 500 to a computer network 530, such as a local area network (LAN), wide area network (WAN), or the Internet.

The illustrated embodiment further includes an optional add-in card 524 that is coupled to an expansion slot of motherboard 508. In one embodiment, add-in card 524 includes an Option ROM 526 on which firmware is stored. Computer system 500 may also optionally include a compact disk-read only memory ("CD-ROM") drive 528 into which a CD-ROM disk may be inserted so that executable files, such as an operating system, and data on the disk can be read or transferred into system RAM 510 and/or hard disk 506. Other mass memory storage devices may be included in computer system 500.

In another embodiment, computer system 500 is a handheld or palmtop computer, which are sometimes referred to as personal digital assistants (PDAs), that may be used with the present invention. Handheld computers may not include a hard disk or other mass storage, and the executable programs are loaded from a corded or wireless network connection into memory 510 for execution by processor 512. A typical computer system 500 will usually include at least a processor 512, memory 510, and a bus (not shown) coupling the memory 510 to the processor 512.

It will be appreciated that in one embodiment, computer system 500 is controlled by operating system software that includes a file management system, such as a disk operating system, which is part of the operating system software. For example, one embodiment of the present invention utilizes Microsoft Windows as the operating system for computer system 500. In another embodiment, other operating systems such as, for example, but not limited to the Apple Macintosh operating system, the Linux operating system, the Microsoft Windows CE operating system, the Unix operating system, the 3Com Palm operating system, or the like may also be used in accordance with the teachings of the present invention.

Thus, embodiments of this invention may be used as or to support a firmware and software code executed upon some form of processing core (such as processor 512) or otherwise implemented or realized upon or within a machine-readable medium. A machine-readable medium includes any mechanism for storing or transmitting information in a form readable by a machine (e.g., a computer). For example, a machine-readable medium can include, but not limited to, a read only memory (ROM), a random access memory (RAM), a magnetic disk storage media, an optical storage media, a flash memory device, or the like. In addition, a machine-readable medium can include propagated signals such as electrical, optical, acoustical or other form of propagated signals (e.g., carrier waves, infrared signals, digital signals, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A method, comprising:
    creating a recovery image of Basic Input/Output System (BIOS) firmware and Non-Volatile Random Access Memory (NVRAM) data of a computer system during a pre-boot phase of the computer system; and
    storing the recovery image at a target location during the pre-boot phase.

2. The method of claim 1, wherein creating the recovery image is performed by executing instructions stored in a firmware storage device of the computer system.

3. The method of claim 1 wherein creating the recovery image is performed by a second computer system coupled to the computer system.

4. The method of claim 1, wherein creating the recovery image includes creating the recovery image in response to a user request made from a menu generated by the execution of instructions stored in a firmware storage device of the computer system.

5. The method of claim 1, wherein the BIOS firmware and the NVRAM data are stored in the recovery image.

6. The method of claim 1, wherein the BIOS firmware is stored in the recovery image and the NVRAM data is stored in a second recovery image.

7. The method of claim 6 further comprising storing the second recovery image at the target location.

8. The method of claim 6, further comprising storing the second recovery image at a second target location.

9. The method of claim 1, wherein the target location is a storage device coupleable to the computer system.

10. The method of claim 1, wherein the recovery image includes a portion of the BIOS firmware to boot the computer system to a BIOS safe mode.

11. The method of claim 1, further comprising recovering the firmware of the computer system from the recovery image stored at the target location.

12. The method of claim 11, wherein recovering the firmware includes loading the recovery image from the target location to a memory device of the computer system and executing instructions contained in the recovery image from the memory device to boot the computer system.

13. The method of claim 1, wherein creating a recovery image includes creating a recovery image in response to a request from an operating system of the computer system during operating system run-time operations.

14. An article of manufacture comprising:
a machine-readable medium on which a plurality of instructions are stored, which when executed perform operations comprising:
creating a recovery image of Basic Input/Output System (BIOS) firmware and Non-Volatile Random Access Memory (NVRAM) data of a computer system during a pre-boot phase of the computer system; and
sending the recovery image to a target location to be stored during the pre-boot phase.

15. The article of manufacture of claim 14, wherein the BIOS firmware and the NVRAM data are stored in the recovery image.

16. The article of manufacture of claim 14, wherein the BIOS firmware is stored in the recovery image and the NVRAM data is stored in a second recovery image.

17. The article of manufacture of claim 14, wherein the recovery image includes a portion of the BIOS firmware to boot the computer system to a BIOS safe mode.

18. The article of manufacture of claim 14, wherein creating the recovery image includes:
presenting a menu to a user of the computer system to select at least one recovery image option;
enabling the user to select at least one recovery image option; and
creating the recovering image according to a selected at least one recovery image option.

19. The article of manufacture of claim 18, wherein the at least one recovery image option includes an option to set the target location.

20. The article of manufacture of claim 18, wherein the at least one recovery image option includes an option to initiate the creation of a recovery image of NVRAM data of the computer system.

21. The article of manufacture of claim 18, wherein the at least one recovery image option includes an option to initiate the creation of a recovery image of the BIOS firmware.

22. The article of manufacture of claim 18, wherein the at least one recovery image option includes an option to initiate the recovery of firmware of the computer system from a recovery image.

23. The article of manufacture of claim 14, wherein execution of the instructions further performs the operations of recovering the firmware of the computer system via the recovery image.

24. The article of manufacture of claim 23, wherein recovering the firmware includes loading the recovery image from the target location to a memory device of the computer system during a pre-boot phase of the computer system and continuing the pre-boot phase by executing instructions contained in the recovery image.

25. The article of manufacture of claim 14, wherein the article of manufacture is a firmware storage device.

26. A computer system, comprising:
a processor; and
at least one flash memory device operatively coupled to the processor on which firmware instructions are stored, which when executed by the processor perform operations comprising:
creating a recovery image of Basic Input/Output System (BIOS) firmware and Non-Volatile Random Access Memory (NVRAM) data of the computer system during a pre-boot phase of the computer system; and
sending the recovery image to a target location to be stored during the pre-boot phase.

27. The computer system of claim 26, wherein the BIOS firmware and the NVRAM data are stored in the recovery image.

28. The computer system of claim 26, wherein the BIOS firmware is stored in the recovery image and the NVRAM data is stored in a second recovery image.

29. The computer system of claim 26, wherein the recovery image includes a portion of the BIOS firmware to boot the computer system to a BIOS safe mode.

* * * * *